(No Model.) 2 Sheets—Sheet 1.

F. C. SOPER.
MOLD FOR FORMING PRISM LIGHTS.

No. 595,274. Patented Dec. 7, 1897.

Witnesses:
Frank S. Blanchard
Donald M. Carter

Inventor:
Frank C. Soper (No Model.) 2 Sheets—Sheet 2.

F. C. SOPER.
MOLD FOR FORMING PRISM LIGHTS.

No. 595,274. Patented Dec. 7, 1897.

Witnesses: Frank S. Blanchard, Donald M. Carter

Inventor: Frank C. Soper.

UNITED STATES PATENT OFFICE.

FRANK C. SOPER, OF CHICAGO, ILLINOIS, ASSIGNOR TO THE LUXFER PRISM PATENTS COMPANY, OF SAME PLACE.

MOLD FOR FORMING PRISM-LIGHTS.

SPECIFICATION forming part of Letters Patent No. 595,274, dated December 7, 1897.

Application filed August 23, 1897. Serial No. 649,233. (No model.)

*To all whom it may concern:*

Be it known that I, FRANK C. SOPER, a citizen of the United States, residing at Chicago, in the county of Cook and State of Illinois, have invented and produced a new and useful Improvement in Molds for Forming Prism-Lights, of which the following is a specification.

My invention relates to prism-lights, and has for its object to provide new and improved molds for forming the same.

My invention is illustrated in the accompanying drawings, wherein—

Figure 1:
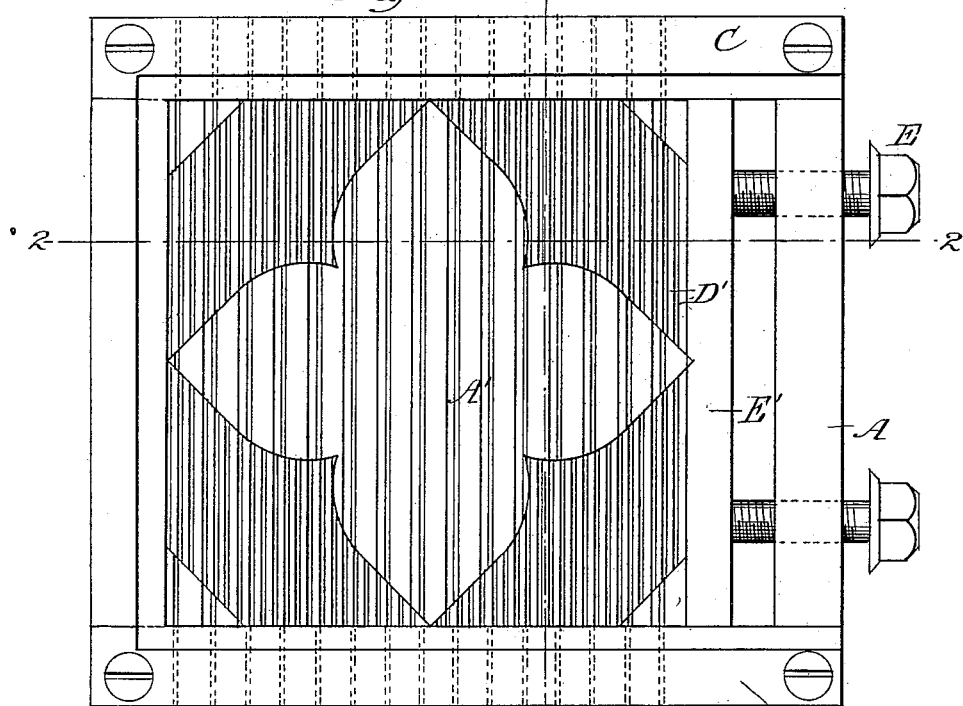
Figure 2:
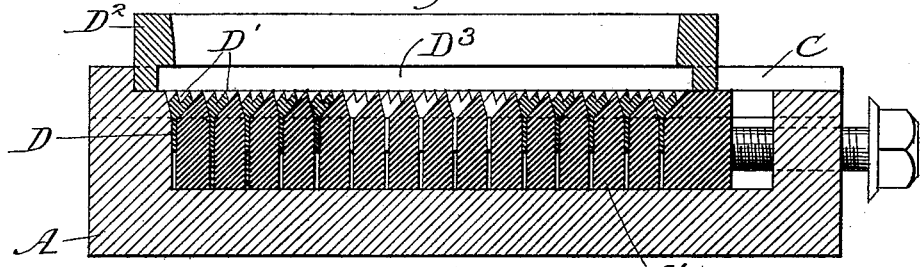
Figure 3:
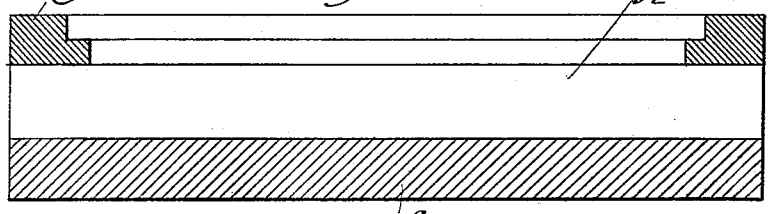
Figure 4:
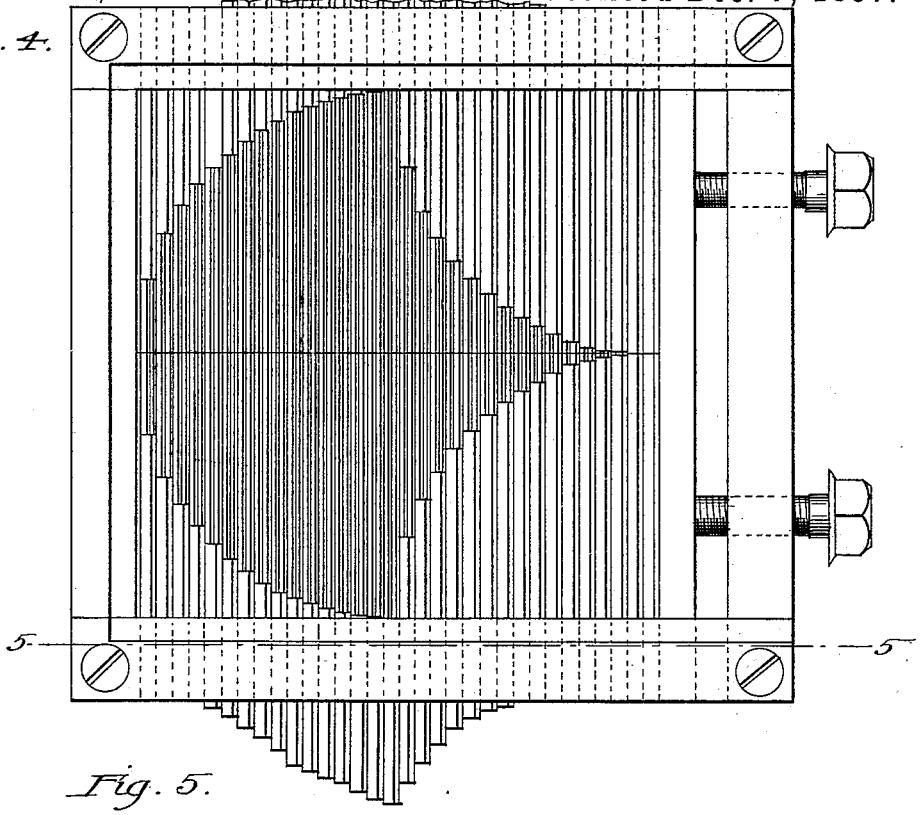
Figure 5:
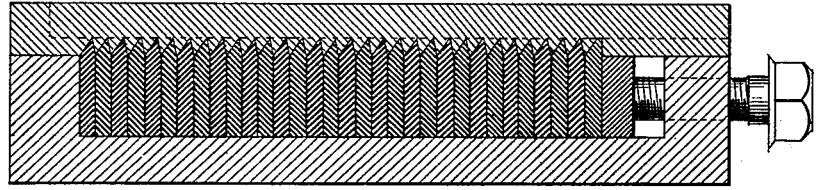
Figure 6:
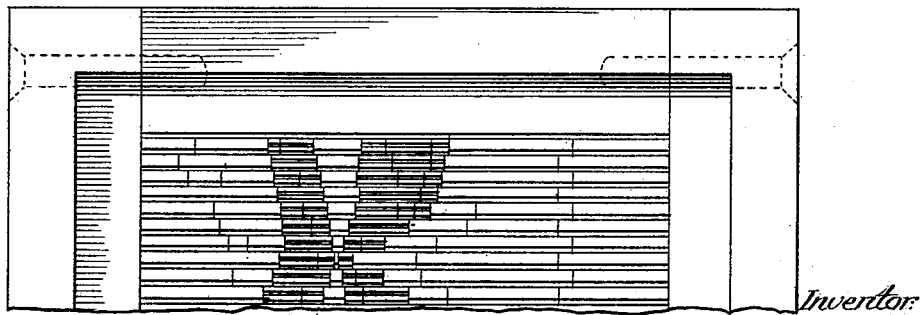

Figure 1 is a plan view of a machine or device for forming prism-lights. Fig. 2 is a section on line 2 2, Fig. 1. Fig. 3 is a section on line 3 3, Fig. 1. Fig. 4 shows a modified form of my device. Fig. 5 is a section on line 5 5, Fig. 4. Fig. 6 shows a further modification.

Like letters refer to like parts throughout the several figures.

I have illustrated in the drawings a machine or mold for forming prism-lights are provided with a design formed by the arrangement of the prisms on the light.

As illustrated in Figs. 1 and 2, the mold proper, A, is provided with a series of movable prisms A', which are placed therein, as shown. These prisms may be formed as shown in Fig. 3 and are held in place by means of the removable pieces C. In the grooves between some or all of these prisms A' are the pieces D, some or all of which are provided at their upper edge with the prisms D'. The prisms D' are formed with different angles or of a different size from the prisms A' and may extend part way or the entire length of the pieces D. These prisms may be formed so as to produce any suitable design upon the prism-light, which is molded in the mold after it has been assembled. These several pieces are forced tightly together and held in place by means of any suitable device—as, for example, the set-screws E and engaging piece E'. A ring $D^2$ is placed over the mold and the glass placed therein and pressed against the prism-forming parts, so as to form the prism-light, as indicated at $D^3$.

In Figs. 4 and 6 I have shown a construction wherein two sets of prisms A' are used, the prisms coming together at the center, so that they may all be separated along the central line. In forming the design on the prism-light the prisms A' are separated at the central point and the prisms D' placed between their separated ends. These prisms D' may be formed so as to produce any desired design. When this construction is used, the parts C are preferably formed with projecting teeth C', as shown in Fig. 4, so as to hold the glass or other material in the mold and at the same time allow longitudinal movement of the prisms A'.

In Fig. 6 the various prisms are formed of any desired length and size and are placed in the mold like type, so as to produce any desired design. The method of forming the prism-lights by means of this device will be readily seen. If, for example, it is desired to form a prism-light with any given design formed directly by the prisms on the face of the light, the desired design is built up in the mold by means of the various prisms. The material from which the prism-light is to be made is then run into the mold while heated and the various prisms are formed upon the light, so as to produce the desired design.

I have shown several constructions for producing my result; but it is evident that these constructions can be varied in many particulars without departing from the spirit of my invention, and I therefore do not wish to be limited in any manner by the construction shown.

I claim—

A device for forming prism-lights, comprising a mold provided with a series of metallic prisms loosely placed therein, said prisms of various sizes and being built up so as to form a design, some of said metallic prisms provided with extending parts which project from the mold, holding-pieces on the side of the mold beneath which said projecting parts extend, and a clamping device adapted to clamp the several prisms so as to hold them in a fixed relative position while the prism-light is being formed.

FRANK C. SOPER.

Witnesses:
DONALD M. CARTER,
HOMER L. KRAFT.